Sept. 13, 1932.    A. O. AUSTIN    1,876,584
CONDUCTOR CLAMP
Filed Feb. 8, 1929    2 Sheets-Sheet 1

INVENTOR
Arthur O. Austin.
BY Alpheus J. Crane
ATTORNEY

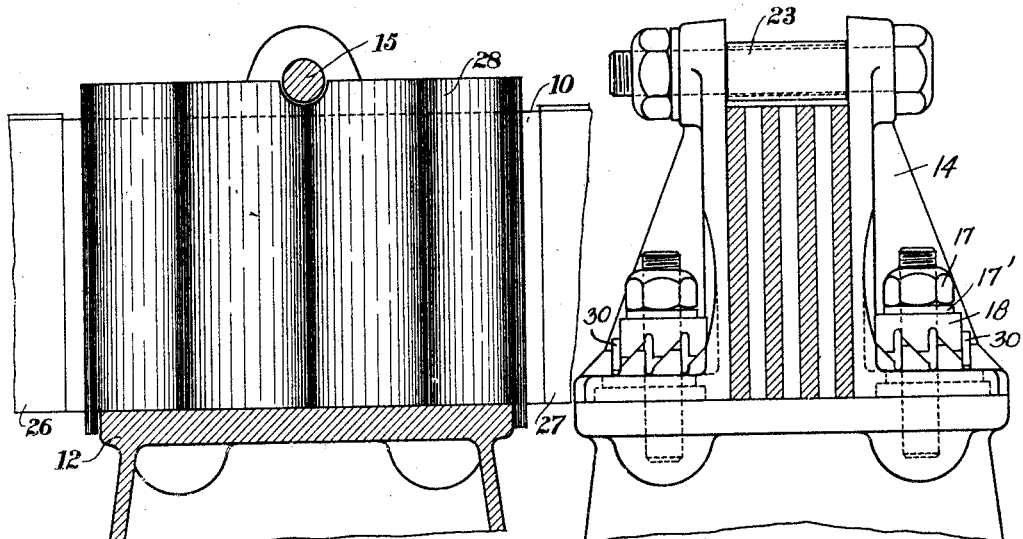
Fig. 5
Fig. 7
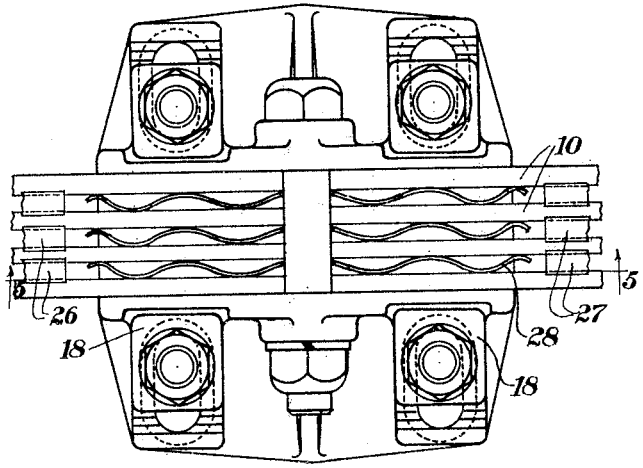
Fig. 6
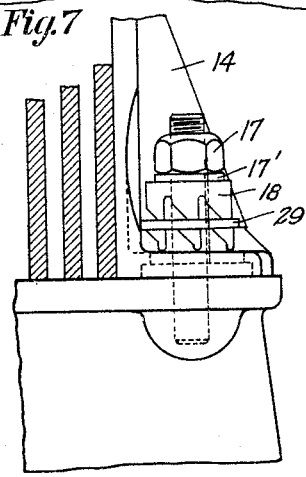
Fig. 8
INVENTOR
Arthur O. Austin.
BY Alpheus J. Crane
ATTORNEY Patented Sept. 13, 1932

1,876,584

UNITED STATES PATENT OFFICE

ARTHUR O. AUSTIN, OF NEAR BARBERTON, OHIO, ASSIGNOR TO THE OHIO BRASS COMPANY, OF MANSFIELD, OHIO, A CORPORATION OF NEW JERSEY

CONDUCTOR CLAMP

Application filed February 8, 1929. Serial No. 338,431.

This invention relates to clamps for bus bars or similar devices and has for its object the provision of a holding device which may be adjusted to bus bars of various thicknesses. A further object is to provide a bus bar clamp which will hold the bus bar firmly in place but will permit longitudinal movement of the bar for temperature expansion and contraction. A further object is to provide a bus bar clamp which may be adjusted to accommodate bus bars of various thicknesses. Another object is to provide a bus bar clamp which shall be of improved construction and operation. Other objects and advantages will appear from the following description.

The invention is exemplified in the combination and arrangement of parts shown in the accompanying drawings and described in the following specification, and it is more particularly pointed out in the appended claims.

In the drawings:

Figure 5 is a vertical sectional view of another modification of the invention, the section being taken on line 5—5 of Figure 6.

Figure 6 is a top plan view of the modification shown in Fig. 5.

Figure 7 is an end elevation of another modification.

Figure 8 is a fragmentary elevation showing still another modification.

Figure 1:
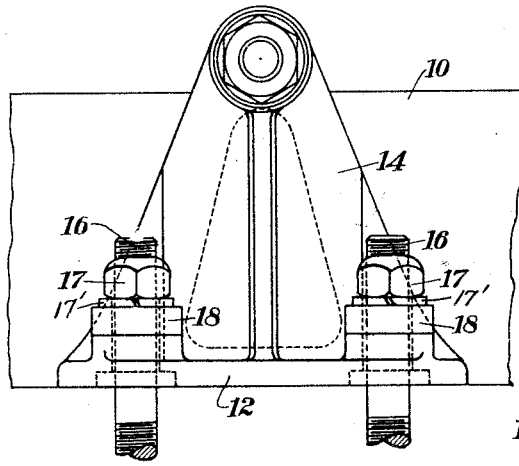
Figure 1 is an elevation of a bus bar clamp showing one embodiment of the present invention.
Figure 2:
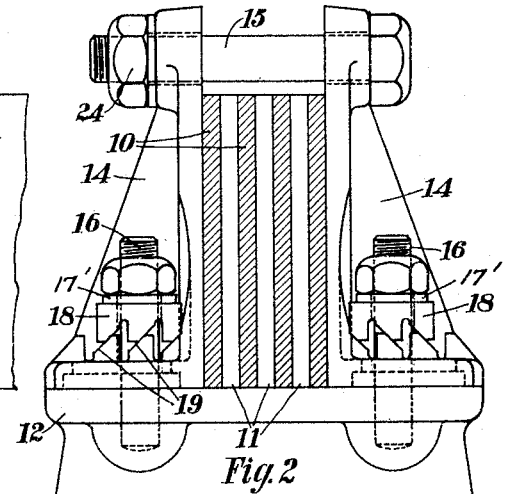
Figure 2 is an elevation looking from the right in Figure 1.
Figure 3:
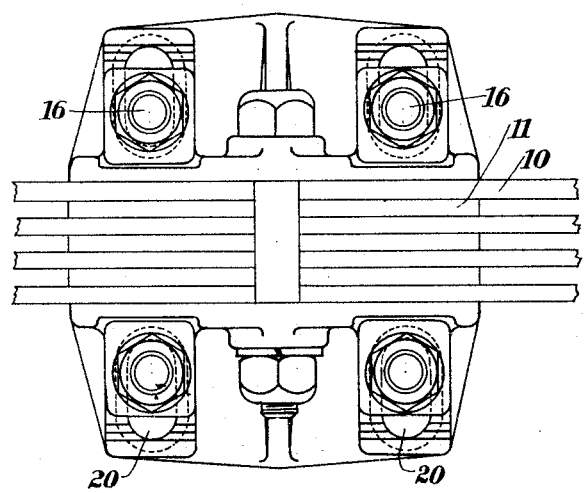
Figure 3 is a top plan view of the clamp shown in Figures 1 and 2.

In insulating bus bars some difficulty is occasioned in providing gripping or clamping means upon the insulator which will accommodate different sizes of bus bars without changing the gripping pieces on the clamp. Where it is desired to hold the bus bar tightly to prevent creeping or movement, it is necessary to grip the bus bar firmly.

There are many cases where it is desired to hold the bus bar in position, but to allow longitudinal movement to take care of expansion or contraction. Unless movement is permitted, the large section of the bus bar will set up very heavy stresses requiring an excessively large insulator. With the present invention it is possible to grip the bus bar tightly or to so install it that it is free to move.

The bars 10 are separated by spacers 11 and are held in position on the cap 12 of the bus insulator by clamping members 14. The clamping members 14 are held at the top by a bolt 15 and are held to the insulator cap by studs, bolts or cap screws 16. The heads of the cap screws or the nuts 17 press upon washers 18 having inclined bearing faces 19 which bear upon complementary faces located on the clamping members 14. Lock washers 17' may be inserted between the nuts 17 and the washers 18. The projections upon the washer 18 and the complementary projections on the bearing members 14 are so arranged that the number of bus bars can be varied by shifting the grip pieces 14 outward or inward. This will shift the washers 18 having the inclined surfaces with respect to the complementary projections and grip pieces so that the same relative position will be maintained with respect to the resultant produced. An example will show the operation.

In adding a bus bar it is common practice to use a spacer between the bars. If a bus bar one-quarter inch thick is added, the width of the total bus composed of several members will be increased one-half inch. If then, the notches or projections upon the clamping washers 18 and the cooperating faces on the clamping pieces 14 are spaced one-quarter inch, all that is necessary to add another bus bar is to move each clamping member 14 out one notch. The same relation will hold as in the previous case. If a bus bar and spacer is removed, the clamping pieces 14 can each be moved in one notch. This makes it possible to maintain the axis of the bus bar in the center of the insulator. It, of course, is evident that the bolts 16 must pass through a slotted hole in the clamping members 14. This slotted hole is shown at 20. If it is desired to move the axis of the bus bar to one side of the insulator this, of course, is possible by simply shifting the clamping members 14 to the proper notches. By providing long slots 20 and a sufficient number of projections on the clamping members, it is possible to accommodate a very wide range of bus bars with a given clamp. The arrangement has the advantage that the bus bar may be maintained in any position with regard to the axis of the insulator, regardless of the width of the bus bar. In addition, the mains which bolts the clamping members to the top of the insulator cap also exerts a pressure longitudinally, clamping the bus bars firmly at all times and preventing their shifting under virbration or load. This clamping action may be further increased by tightening the bolt 15.

It is evident that the bus bar may be shifted to one side or the other by tightening or loosening the nuts 17. If it is desired to shift the bus bar towards a given side, the nuts are loosened on that side so as to allow the clamping piece to move outward. At the same time, the nuts acting upon the clamping piece on the opposite side are tightened down. Movement may be provided within the limits of the clamping washers. While the clamping washers may have a single inclined surface, it is usually preferable to provide them with a number of surfaces, as the washers can be smaller and properly spaced will cover a wide range of thickness on the bus bar.

Figure 4:
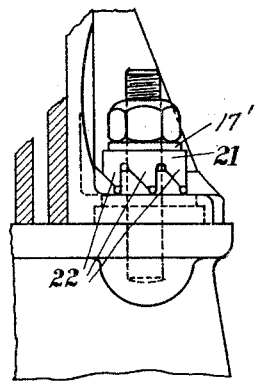
Figure 4 is a fragmentary elevation showing a modification of the invention.

The washer 18 is provided with a hole which fits rather closely to the bolt 16. This is necessary where clamping is desired, as the washer 18 must press against the bolt or cap screw so as to exert a force upon the clamping member 14 which will force it inward towards the bus bar. Where it is desired to eliminate the clamping action, but at the same time hold the clamping members 14 down tightly, all that is necessary is to provide a washer 18 with an elongated hole so that the washer will not press in a lateral direction against the bolt 16 and will exert a downward pressure only. Where a definite fixed position is desired, a washer 21 shown in Fig. 4 may be used in which the hole through the washer is located in a definite relation to the projections 22 having inclined faces. In this case, the projections 22 bear upon the vertical sides as well as the inclined surfaces so there is no tendency to slip or force the clamping members laterally. Where it is desired to use the regular clamping washers 18 without having them exert a lateral force, this can be readily accomplished by placing a flat washer 29 between the two surfaces, as shown in Fig. 8 or by placing a shim 30 of proper thickness between the vertical faces of the washer 18 and the corresponding notches on the clamping members 14. This arrangement is shown in Fig. 7.

Where it is desired to allow the bus bars to move, sleeve 23 of proper length may be placed over the bolt 15 so that pressure exerted by the clamping members 14 will be exerted upon this sleeve. Considerable resiliency or take up in the clamping means is provided by using spring lockwashers under the nuts 17 and 24. By providing suitable resiliency at this point, the pressure may be limited, thereby holding the bus bars firmly, but at the same time preventing any looseness. Where a greater amount of resiliency is desired, the spacers may be placed outside of the clamping means as at 26 and 27 Fig. 6 or, if desired, a resilient type of spacer 28 of any suitable form may be placed between the members. The resilient spacers 28 may be made out of comparatively thin material and yet exert practically any desired pressure. Where resilient spacers are used, the clamping washer 18 with the corresponding notches in the clamping members may be such that the clamping washers may be clamped down until no further lateral movement is possible. In this case the inclined surfaces permit the insertion of the resilient members but, at the same time, provide a sufficient means for drawing in the clamping members against the resistance set up by the resilient spacers.

Heavy currents set up forces which will cause vibration. Where there is any looseness between the bus bar and clamping member, the pounding action is likely to damage or loosen attachments or the insulators. The clamping means as well as the resilient spacers provide an efficient method for controlling the pressure upon the bus bars and at the same time preventing any looseness, even though the bus bars are so gripped as to allow longitudinal movement. The resilient spacers 28 may be held by any suitable means either to the bus bars or the cap to prevent movement relative to the bus bar. One method is to provide these members with a notch or projection which will engage the bolt 15 or the cap 12 of the insulator. If desired, the resilient spacers may be placed at either side of the bus clamp. In this case it would be held to the bus bar by a pin passing through all of the members or by suitable projections. The resilient spacers may be used in combination with rigid spacers if desired where the amount of resiliency need not be large. Where the bus bars are held firmly in contact at all times either through the takeup in the clamping members 14 or by means of resilient spacers, it is possible to equalize the current at different sections in the bus bar, even through a great difference in resistance may exist in certain parts of contact or joint.

I claim:

1. A holding device for a conductor comprising a base having a bearing surface, a clamping jaw mounted on said base, said jaw having abutments determining a plurality of positions of adjustment of said jaw on said base for accommodating conductors of various sizes, said jaw being movable along said surface in a direction parallel to said surface, and means for securing said jaw to said base, said securing means exerting pressure on said jaw toward said conductor through a limited range of movement of said jaw for each position of adjustment of said jaw.

2. A holding device for a conductor comprising a base having an upper flat bearing surface, a pair of jaws mounted on said base for holding a conductor therebetween, said jaws having lower flat faces slideably mounted on the bearing surface of said base and having stepped abutments providing a plurality of different positions of adjustment of said jaws on said surface of like spacing to facilitate symmetrical arrangement of said jaws relative to a central plane.

3. A holding device for a conductor comprising a base, a jaw movably mounted on said base and having a plurality of inclined bearing surfaces thereon, and a holding device for securing said jaw to said base, said holding device having inclined faces engaging said inclined bearing surfaces respectively to hold said jaw to said base and to press said jaw against the conductor.

4. A holding device for a conductor comprising a base, a jaw movably mounted on said base, a screw for securing said jaw to said base, said jaw having an opening through which said screw passes of a size larger than said screw, and a washer on said screw, said jaw and washer having engaging inclined bearing surfaces for holding said jaw to said base and for pressing said jaw toward the conductor.

5. A holding device for a conductor comprising a pair of spaced jaws, each having a plurality of inclined bearing surfaces thereon, screws for holding said jaws to said base and washers on said screws having inclined bearing surfaces for engaging the bearing surfaces on said jaws.

In testimony whereof I have signed my name to this specification this 7th day of February A. D. 1929.

ARTHUR O. AUSTIN.